United States Patent [19]
Ridder et al.

[11] Patent Number: 5,171,170
[45] Date of Patent: Dec. 15, 1992

[54] SHIP'S DRIVE WITH TROLLING DEVICE

[75] Inventors: Gerhard Ridder, Witten; Jürgen Burdack, Letmathe, both of Fed. Rep. of Germany

[73] Assignee: Mannesmann Aktiengesellschaft, Dusseldorf, Fed. Rep. of Germany

[21] Appl. No.: 717,338

[22] Filed: Jun. 18, 1991

[30] Foreign Application Priority Data

Jun. 18, 1990 [DE] Fed. Rep. of Germany ....... 4019687

[51] Int. Cl.⁵ .............................................. F16D 39/02
[52] U.S. Cl. .......................................... 440/1; 44/75
[58] Field of Search ..................... 330/1, 2, 5, 6, 7, 75; 192/3.21, 101, 82 R, 30 W, 129 A, 150

[56] References Cited

U.S. PATENT DOCUMENTS 3,887,048   6/1975  Jahnel et al. ............................ 440/1

FOREIGN PATENT DOCUMENTS 3018642  11/1981  Fed. Rep. of Germany .......... 440/1
112394    9/1981  Japan .................................... 440/1

*Primary Examiner*—Galen Barefoot
*Assistant Examiner*—Stephen P. Avila
*Attorney, Agent, or Firm*—Cohen, Pontani, Lieberman, Pavane

[57] ABSTRACT

The present invention relates to a ship's drive having a transmission which is arranged between the engine and the propeller which has hydraulically controllable, and optionally actuatable forward and reverse clutches, as well as a trolling device provided with a pressure reduction valve. In order to create a ship's drive which has a trolling device and, by simple means and at little expense, which prevents destruction of the clutches as a result of erroneous operation and permits reliable maneuvering of a ship in every condition of operation of the trolling device, the pressure-reduction valve of the trolling device has an electro-hydraulic control unit and that, between the pressure reduction valve and at least one of the clutches, a valve is arranged which is hydraulically in communication with the pressure reduction valve and is connected to the pressurized oil line. A non-return valve is arranged between a feed line to the clutch and a rapid-vent line. The device thus prevents operation of the trolling device in an unsafe operating region in a fail-safe manner.

9 Claims, 1 Drawing Sheet

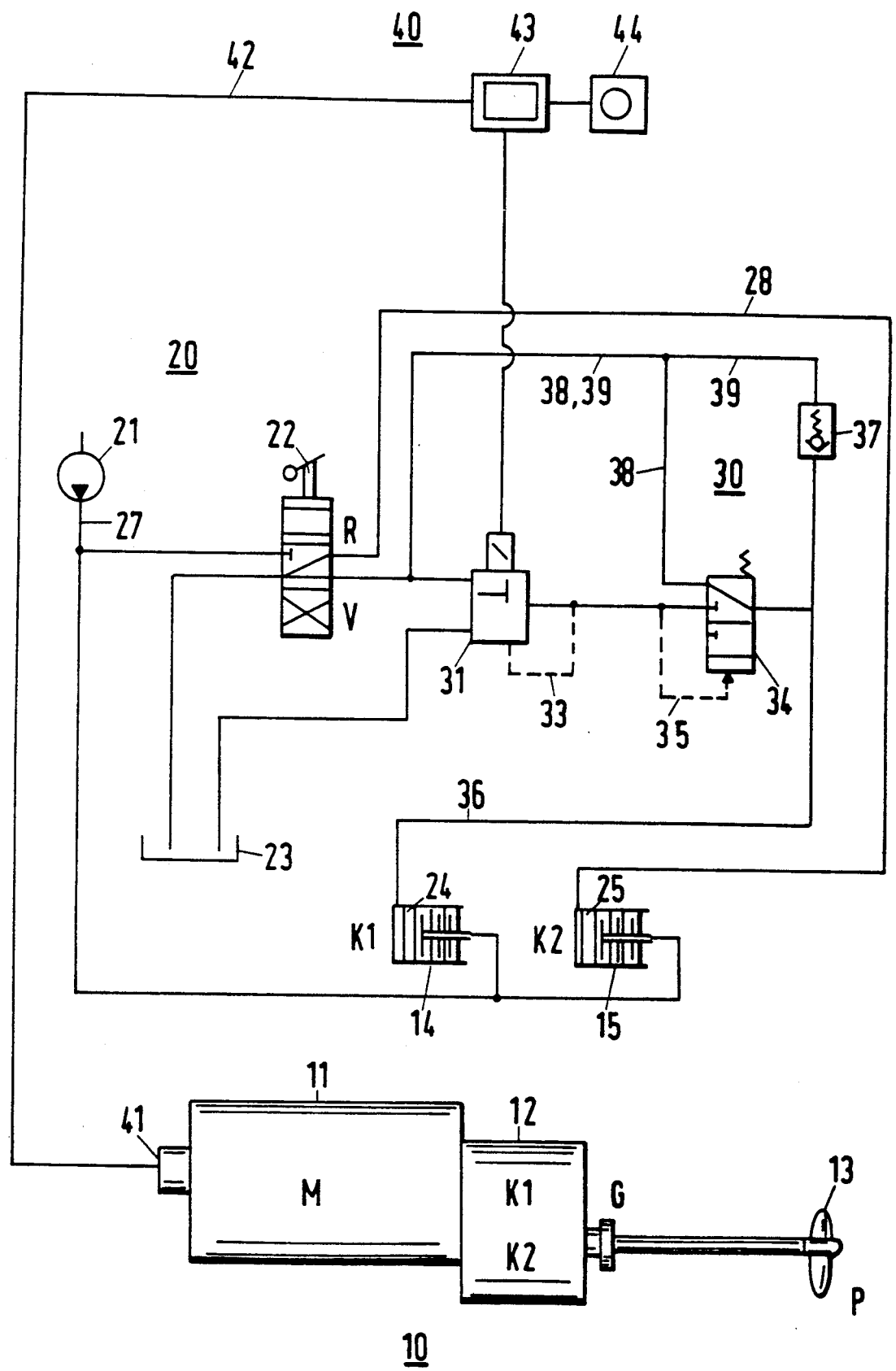

SHIP'S DRIVE WITH TROLLING DEVICE

FIELD OF THE INVENTION

The present invention relates to a ship's drive having a transmission which is arranged between the engine and the propeller and which has hydraulically controllable, optionally actuatable forward and reverse clutches as well as a trolling device provided with a pressure-reduction valve, for allowing a ship to be maneuverable and be propelled at low speeds.

BACKGROUND OF THE INVENTION

In a ship's drives with trolling devices there exists the possibility of controlling the speed of rotation of the propeller with constant speed of rotation of the engine. Thus, the ship's engine can be run at a minimum speed, and the propeller can rotate at a speed slower than that normally allowed by the final drive ratio of the transmission, by means of slippage in the clutch assembly. This slippage may be controlled to vary the propeller speed independently of the engine speed. Trolling is employed especially during harbor maneuvers and travel through channels since these usually require slow rates of travel. In such case, as a rule, with a constant transmission ratio, the speed of the ship is still too great at the lowest possible speed of rotation of the engine, given the final drive ratio, to maintain the required slow speeds. Trolling is also used when a creep speed is maintained when using a trawler net.

By means of a trolling device, the propeller speed of rotation can generally be reduced to about 0.9 to about 0.4 times the drive speed of rotation during non-trolling operation. The reduction in the propeller speed of rotation is achieved, for a given speed of rotation of the engine, by a specified slippage of the disks of the forward and reverse clutches, which are normally implemented as a multiple-disk clutch.

In the multiple-disk clutch, the disks are released by spring pressure and pressed against each other by clutch oil pressure. Thus, when the clutch oil pressure is low, the disks slip, and when the oil pressure is high, the clutch is engaged and the slippage is minimal. When the force exerted by the oil approximately balances the spring tension, there will be a partial slippage which will cause the propeller to spin at a lower speed than normally possible if the clutch does not slip.

In trolling operation the clutch oil pressure is reduced to such an extent that a specific slipping process is maintained. In addition, upon instituting a trolling operation, a greatly increased amount of oil is conducted through the clutch disks for lubrication and removal of the frictionally generated heat, otherwise, damage to the transmission may result.

German Federal Republic Patent 24 42 301 discloses a transmission for water vehicles with hydraulically controllable clutches and a pressure control valve means for regulating the increase in pressure in the pressure fluid fed to the controlled clutch. Control devices are provided with manually actuatable elements for the fine adjustment of the creeping-speed range of the water vehicle.

However, in the trolling device known from DE 24 42 301, it is possible to destroy the clutches under certain attainable conditions of operation. This is particularly true if the control device for the controlling the pressurized oil is set to slow the speed of rotation of the propeller, and thus increase clutch slippage, and at the same time the engine is operated at high speeds of rotation. Under such operating conditions, the lubricating oil is unable to remove the amount of frictional heat produced by the rubbing of the disks in multiple-disk clutches and thus cannot maintain acceptable operating temperatures for an extended period of time. As a result of the insufficient removal of heat, the oil may be degraded or cracked, and the frictional forces may increase so that the clutch disks eventually become welded to each other.

OBJECTS OF THE INVENTION

It is an object of the present invention to create a ship's drive which has a trolling device which, by simple means and with little expense, prevents destruction of the clutches by erroneous operation in a forbidden region where the frictional heating exceeds the heat dissipation capacity for appreciable periods and permits dependable maneuvering of a ship under every condition of operation of the trolling device.

It is also an object of this invention to provide a ship's drive having a transmission which is arranged between the engine and the propeller which has hydraulically controllable, optionally actuatable forward and reverse clutches, as well as a trolling device provided with a pressure reduction valve, characterized by the fact that the pressure reduction valve of the trolling device has an electro-hydraulic control unit and that, between the pressure reduction valve and at least one of the clutches, there is arranged a valve which is hydraulically in communication with the pressure reduction valve and is connected to the pressurized oil line, and that a non-return valve is provided between a feed line to the clutch and a rapid-vent line.

SUMMARY OF THE INVENTION

In the ship's drive of the present invention, a valve is arranged between a pressure reduction valve of the trolling device and a clutch provided for trolling operation. This valve is hydraulically in communication with the pressure reduction valve and at the same time can be connected to the pressure line. With sufficient control pressure, the valve is switched into the "trolling" operating position. The pressure reduction valve, controlled by the control unit, sets the desired pressure in the pressurized oil line. The clutch increasingly slips when the oil pressure is reduced to a value lower than the value at which the clutch is fully engaged. The propeller shaft thus turns more slowly than would otherwise result from the step-down ratio from the speed of rotation of the engine, which is established by the transmission. The speed of rotation can be decreased continuously by 10 to 60% of the non-trolling operation. Downstream of the two-way valve, a feed line to the clutch is provided. This feed line is connected via a non-return valve with a line for rapid venting, which is in communication with the oil tank.

The pressure reduction valve is provided with an electric "desired value" transmitter, i.e. a set point, for determining the default slippage. This desired-value transmitter allows the master of the vessel to set the creeping speed as desired.

In addition to this, the electronic control unit is connected to a rotational speed recorder by which the instantaneous speed of rotation of the motor shaft can be noted. When a predetermined value is exceeded, the pressure-reduction valve is switched by the electronic control unit to the resting position, thus reducing the pressure subsequent to the pressure-reduction valve. This would normally allow the biasing spring in the clutch assembly to disengage the clutch, increasing the slippage. However, when the oil pressure drops below a predetermined value, the spring-loaded directional valve, which is arranged between the pressure-reduction valve and the clutch, switches to the resting position, with the result that the clutch is acted on by the full oil pressure and is fully engaged and switched into operating position. The propeller is driven without slippage and the ship remains fully maneuverable. However, the ship is accelerated because of the decrease in slippage and therefore increase in propeller speed in this case.

The master of the ship, who is, for instance, maneuvering in the harbor, may now again resuming the trolling operation if the ship begins to travel too quickly. In this case, the master will be alerted that the transmission was set in an unsafe operating condition and will then set an adapted, and therefore slower, speed of rotation of the engine in order to return to safe operating conditions trolling. The trolling control is actuated by the master of the ship, for instance by means of a button accessible to him. However, if the master desires an increased rate of speed, he can—even when he has forgotton to shut off the trolling device—continue to allow the ship to travel at the increased rate of speed without the risk of transmission damage due to the occurrence of high loads which would destroy the clutch. With the control unit of the trolling device connected, the device becomes active again only when the control is activated and the speed of rotation of the engine is reduced, preferably to less than 1000 rmp.

In the case of a failure of the electrical system on board the ship, the pressure-reduction valve is disconnected and the pressure in the hydraulic line between pressure-reduction valve and clutch is reduced to such an extent that the spring-loaded valve switches to the resting position, with the result that the clutch is acted on by the full oil pressure and the propeller is driven without substantial clutch slippage via the transmission, thus eliminating the possibility of transmission damage due to operation of the trolling device in an unsafe operating region.

The externally actuated directional valve for connecting of the forward or reverse clutches can be arranged in the hydraulic circuit prior or subsequent to the trolling device. Since the trolling operation is employed essentially only upon forward travel, it is logical to arrange the trolling device in the vicinity of the forward clutch.

In addition to the measurement of the rotational speed, there is also the possibility of recording other measured values, such as oil temperature or oil pressure, in order to control the trolling device, depending on the type of control desired. For example, if the oil temperature is measured as it exits the clutch housing, when the oil temperature exceeds the maximum permissible operating temperature, the pressure reduction valve would be returned to the resting position, fully engaging the clutch. If the oil pressure is measured, if the pressure drops from normal operating levels, the trolling operation could be disengaged, also preventing damage to the transmission.

Upon measurement of the rotational speed, both underspeed and overspeed conditions of rotation are monitored, and the electronic control unit controls the pressure reduction valve to disconnect the current. By monitoring underspeed conditions below a given speed of rotation, if the rotational speed sensor fails, resulting for instance from the breaking of a cable, the electronic control unit can be switched to hydraulic operation. This provides a fail-safe system. If under such conditions, the operation of the trolling device, while the system is unable to detect the possibility operation in an unsafe operating condition, i.e. incapable of recognizing a maximum value of engine rotational speed, would have a negative influence on the life of the clutch.

BRIEF DESCRIPTION OF THE DRAWING

One embodiment of the invention is shown in the drawing which is a diagrammatical representation of a ship's drive of the present invention.

DETAILED DESCRIPTION OF THE PREFERRED EMBODIMENTS

The ship's drive 10 has an engine 11, a transmission 12, and a propeller 13 (P). The transmission 12 is functionally connected with the forward clutch 14 (K1) and the reverse clutch 15 (K2).

A rotational speed recorder 41, part of the speed of rotation control 40 is provided on the engine 11, which, via a connecting line 42, is in communication with an electronic control unit 43. A desired-value transmitter 44 is arranged on the electronic control unit 43.

The electronic control unit 43 is connected electrically to a pressure reduction valve 31 of the trolling device 30, which is hydraulically in communication with the hydraulic device 20. The hydraulic device 20 includes a pump 21, as well as a directional valve 22 arranged in a pressurized oil line 27. The pump 21 also supplies oil for cooling to the forward clutch 14 and the reverse clutch 15.

The pressure reduction valve 31 can be implemented as a proportional-type valve with the hydraulic pressure acting via the line 33. The pressure reduction valve 31 is arranged downstream of the directional valve 22, through a feed line (V), in the direction of flow. The pressure reduction valve 31 and the directional valve 22 are each arranged in association with a reservoir 23 for venting.

The pressure reduction valve 31 is in communicaton, in the direction of flow, with a spring-loaded directional valve 34 to which a control oil line 35 is connected. A forward clutch feed line 36 is provided between the spring-loaded directional valve 34 and the forward clutch hydraulic actuator 24 of the forward clutch 14. A bypass line 38 bypassing the pressure reduction valve 31 is also arranged on the spring-loaded directional valve 34. A rapid vent line 39 is also in communication with the bypass line 38, and a non-return valve 37 is provided in the rapid vent line 39. The non-return valve 37 is hydraulically in communication with the spring-loaded directional valve 34 and the clutch 14.

The directional valve 22 activates either the system for operating the forward clutch 14, including the trolling device 30 and the reverse clutch 15 directly. Thus, the directional valve 22 is also upstream of and in communication with the reverse clutch feed line 28 (R) which is further in communication with the reverse clutch hydraulic actuator 25 of the reverse clutch 15.

It should be understood that the preferred embodiments and examples described are for illustrative purposes only and are not to be construed as limiting the scope of the present invention which is properly delineated only in the appended claims.

What is claimed is:

1. A device for preventing operation of a ship's drive clutch in an unsafe operating region comprising:
    a clutch having at least two clutch plates, and capable of generating frictional heat during a relative movement between the at least two plates;
    biasing means at said clutch for providing a bias to separate said at least two clutch plates;
    proportionally acting actuation means at said clutch for providing a force for operatively engaging said at least two clutch plates to provide a coupling therebetween;
    an actuation attenuation means operatively connected to said actuation means for attenuating the force supplied by said actuation means;
    a detector means for detecting when the clutch is operating in an unsafe operating range; and
    a control means for receiving as an input the output of the detector means and for controlling the actuation attenuation means in order to reduce the frictional heat generation in the clutch.

2. A clutch according to claim 1, wherein said detector means comprises a speed of rotation detector of said input shaft.

3. A drive for a ship's propeller comprising:
    a pressurized hydraulic oil source;
    a transmission which is arranged between an engine and a propeller, having a hydraulically controllable clutch comprising at least two clutch plates;
    a trolling device comprising a pressure-reduction valve and an electronic-hydraulic control unit;
    a bypass valve which is in hydraulic communication with said hydraulic oil source and said pressure-reduction valve and is also in hydraulic communication said hydraulically controllable clutch;
    an unsafe operating condition sensor;
    a trolling control for controlling said trolling device having as an input said unsafe operating condition sensor, so that when said trolling control detects an unsafe operating condition from said unsafe operating condition sensor, said trolling control controls said trolling device to activate said bypass valve to bypass said pressure reduction valve and to allow communication of hydraulic oil from said hydraulic oil source to said hydraulically controlled clutch.

4. A ship's drive according to claim 3, further comprising:
    a non-return valve in hydraulic communication with said hydraulic oil source and to said hydraulically controlled clutch.

5. A ship's drive according to claim 3, wherein said trolling control comprises an electronic control unit having a continuously variable desired-value transmitter for varying a pressure reduction by said pressure reduction valve.

6. A ship's drive according to claim 3, wherein said unsafe operating condition sensor is a rotational speed transducer for measuring the rotational speed of the engine.

7. A ship's drive according to claim 3, wherein when said electronic-hydraulic control unit causes said bypass valve to bypass said pressure reduction valve when an electrical power source is disconnected.

8. A ship's drive according to claim 3, wherein said bypass valve comprises a hydraulically actuatable spring-loaded directional valve.

9. A ship's drive according to claim 3, wherein said pressure-reduction valve comprises a proportional pressure-reduction valve.

* * * * *